(12) United States Patent
Hiehata et al.

(10) Patent No.: US 9,077,174 B2
(45) Date of Patent: *Jul. 7, 2015

(54) ESD PROTECTION DEVICE AND MANUFACTURING METHOD THEREFOR

(71) Applicant: Murata Manufacturing Co., Ltd., Kyoto-fu (JP)

(72) Inventors: Kumiko Hiehata, Kyoto (JP); Takahiro Sumi, Kyoto (JP); Jun Adachi, Kyoto (JP); Jun Urakawa, Kyoto (JP); Takayuki Tsukizawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 182 days.

This patent is subject to a terminal disclaimer.

(21) Appl. No.: 13/852,227

(22) Filed: Mar. 28, 2013

(65) Prior Publication Data

US 2013/0222956 A1 Aug. 29, 2013

(30) Foreign Application Priority Data

Sep. 29, 2010 (JP) ................. 2010-218469

(51) Int. Cl.
| | |
|---|---|
| *H02H 9/00* | (2006.01) |
| *H02H 9/04* | (2006.01) |
| *H01C 7/12* | (2006.01) |
| *H01T 1/20* | (2006.01) |
| *H01T 2/02* | (2006.01) |
| *H01T 4/10* | (2006.01) |

(52) U.S. Cl.
CPC .............. *H02H 9/046* (2013.01); *H01C 7/12* (2013.01); *H01T 1/20* (2013.01); *H01T 2/02* (2013.01); *H01T 4/10* (2013.01)

(58) Field of Classification Search
USPC ................................... 361/56, 112
See application file for complete search history.

(56) References Cited

U.S. PATENT DOCUMENTS 8,421,582 B2 * 4/2013 Hiehata et al. ................. 338/20

FOREIGN PATENT DOCUMENTS

| | | |
|---|---|---|
| CN | 101536275 A | 9/2009 |
| CN | 101540856 A | 9/2009 |
| JP | 2005-276666 A | 10/2005 |
| JP | 2008-258614 A | 10/2008 |

(Continued)

OTHER PUBLICATIONS

Machine translation of WO 2009098944 Aug. 13, 2009 (WIPO document provided in 1449 of Mar. 11, 2014).*

(Continued)

*Primary Examiner* — Ronald W Leja (74) *Attorney, Agent, or Firm* — Pearne & Gordon LLP (57) ABSTRACT

The ESD protection device includes: opposed electrodes 2 including an opposed electrode 2a on one side and an opposed electrode 2b on the other side, and a discharge auxiliary electrode 3, the discharge auxiliary electrode being placed so as to extend from the opposed electrode on one side to the opposed electrode on the other side, wherein the discharge auxiliary electrode contains metal grains, semiconductor grains and a glass material, the metal grains, the semiconductor grains, and the metal grain and the semiconductor grain are bound together, respectively, via the glass material, the average grain size X of the metal grains is 1.0 μm or more, and the relationship between the thickness Y of the discharge auxiliary electrode and the average grain size X of the metal grains satisfies the requirement of $0.5 \leq Y/X \leq 3$.

8 Claims, 3 Drawing Sheets

(56) References Cited

FOREIGN PATENT DOCUMENTS

| JP | 2009-152348 A | 7/2009 |
|----|---------------|--------|
| JP | 4434314 B2 | 3/2010 |
| JP | 2010-129323 A | 6/2010 |
| JP | 5310863 B2 | 10/2013 |
| WO | 2009/098944 A1 | 8/2009 |
| WO | 2010/061550 A1 | 6/2010 |

OTHER PUBLICATIONS

Japanese Office Action for Application No. 2012-536466 dated Jan. 21, 2014.
International Search Report and Written Opinion for PCT/JP2011/072015 dated Dec. 13, 2011.
Office Action issued in Chinese Application No. 201180047352.7 dated Feb. 12, 2014.
Notice of Second Office Action issued in corresponding Chinese Patent Application No. 20118/0047352.7 dated Aug. 1, 2014.

* cited by examiner

ESD PROTECTION DEVICE AND MANUFACTURING METHOD THEREFOR

BACKGROUND OF THE INVENTION

1. Field of the Invention

The present invention relates to an ESD protection device for protecting a semiconductor device, etc. from electrostatic discharge failures, and a method for manufacturing the ESD protection device.

2. Description of the Related Art

In recent years, for the use of commercial-off-the-shelf appliances, there has been a tendency to increase the frequency of inserting and removing cables as input-output interfaces, and static electricity is likely to be applied to input-output connector areas. In addition, miniaturization in design rule with increase in signal frequency has made it difficult to create paths, and LSI itself has been fragile to static electricity.

Therefore, ESD protection devices have been used widely for protecting semiconductor devices such as LSI from electron-statics discharge (ESD).

As the ESD protection device described above, an overvoltage protection element having a porous structure part connected between a first electrode and a second electrode and produced by carrying out a firing treatment using a material of an overvoltage protection element which contains a non-conductor powder (silicon carbide powder), a metal conductor powder (Cu powder) and an adhesive (glass) is proposed.

In the case of the overvoltage protection element, however, addition of an adhesive (glass) is absolutely necessary, and therefore the following problems may occur.

(1) It is difficult to provide products of high reliability as variations in product characteristics tend to increase due to poor dispersion of glass.

(2) When ESD is applied repeatedly, the short circuit resistance tends to be degraded due to poor dispersion of glass.

Patent Document 1: Japanese Patent Application Laid-Open No. 2008-85284

BRIEF SUMMARY OF THE INVENTION

The present invention has been achieved in view of the circumstances described above, and an object of the present invention is to provide an ESD protection device which has stable characteristics, which are not degraded even if the static electricity is applied repeatedly, and a method for manufacturing the ESD protection device.

In order to solve the problems described above, an ESD protection device according to the present invention includes: on the surface of a ceramic base material, opposed electrodes provided with an opposed electrode on one side and an opposed electrode on the other side, the opposed electrodes formed so as to be opposed to each other at a distance therebetween; and
a discharge auxiliary electrode contacting each of the opposed electrode on one side and the opposed electrode on the other side constituting the opposed electrodes, the discharge auxiliary electrode being placed so as to extend from the opposed electrode on one side to the opposed electrode on the other side,
wherein the discharge auxiliary electrode contains metal grains, semiconductor grains and a glass material, the metal grains, the semiconductor grains, and the metal grain and the semiconductor grain are bound together, respectively, via the glass material, the average grain size X of the metal grains is 1.0 μm or more, and the relationship between the thickness Y of the discharge auxiliary electrode and the average grain size X of the metal grains satisfies the requirement of $0.5 \leq Y/X \leq 3$.

When as the aforementioned ceramic base material, a ceramic base material containing a glass component is used, the ESD protection device according to the present invention preferably includes between the discharge auxiliary electrode and the ceramic base material a sealing layer for preventing ingress of the glass component from the ceramic base material into the discharge auxiliary electrode.

The ESD protection device according to the present invention preferably includes a protective layer that covers the exposed surface of the discharge auxiliary electrode.

The metal grains are preferably Cu grains, and the semiconductor grains are preferably silicon carbide grains.

The glass material is preferably produced by a reaction of the metal grains with the semiconductor grains.

Furthermore, a method for manufacturing an ESD protection device according to the present invention includes the steps of: printing onto one principal surface of a first ceramic green sheet a discharge auxiliary electrode paste which contains metal grains having an average grain size of 1.0 μm or more, semiconductor grains and an organic vehicle and in which at least one of the metal grain and the semiconductor grain has on the surface a glass network forming component, and the ratio of the total of the metal grains and the semiconductor grains is 7% by volume to 25% by volume, thereby forming an unfired discharge auxiliary electrode;
printing an opposed electrode paste on one principal surface of the first ceramic green sheet, thereby forming unfired opposed electrodes provided with an opposed electrode on one side and an opposed electrode on the other side, the opposed electrodes each partially covering the discharge auxiliary electrode, and the opposed electrodes being placed at a distance therebetween;
stacking a second ceramic green sheet on the other principal surface of the first ceramic green sheet, thereby forming an unfired laminated body; and
firing the laminated body to react the surfaces of the metal grains of the discharge auxiliary electrode and the surfaces of the semiconductor grains, thereby producing a glass material.

The metal grains contained in the discharge auxiliary electrode are alumina-coated Cu grains, and the semiconductor grains are silicon carbide grains.

An ESD protection device according to the present invention includes: on the surface of a ceramic base material, opposed electrodes provided with an opposed electrode on one side and an opposed electrode on the other side, the opposed electrodes being opposed to each other; and a discharge auxiliary electrode partially contacting the opposed electrode on one side and the opposed electrode on the other side, the a discharge auxiliary electrode being placed so as to extend from the opposed electrode on one side to the opposed electrode on the other side, wherein the discharge auxiliary electrode contains at least metal grains, semiconductor grains and a glass material, the metal grains, the semiconductor grains, and the metal grain and the semiconductor grain are bound together, respectively, via the glass material, the average grain size X of the metal grains is 1.0 μm or more, and the relationship between the thickness Y of the discharge auxiliary electrode and the average grain size X of the metal grains satisfies the requirement of $0.5 \leq Y/X \leq 3$, so that there can be provided an ESD protection device which has stable characteristics, which are not degraded even if the static electricity is applied repeatedly.

In the present invention, the situation in which metal grains, semiconductor grains, and the metal grain and the semiconductor grain are bound together, respectively, via a glass material have a wide range of concepts including:

(a) situation in which grains are bound together by a glass material penetrating between the grains;

(b) situation in which grains are covered in their entirety with a glass material, and the grains are bound together by the glass material;

(c) situation in which a glass material does not cover grains in their entirety or penetrate between the grains but for example, the grains are bound by a glass material scattered on the surfaces of the grains; and so on.

By using, as a ceramic base material, one containing a glass component, and by providing between the discharge auxiliary electrode and the ceramic base material a sealing layer for preventing ingress of the glass component from the ceramic base material and the discharge auxiliary electrode, there can be provided an ESD protection device which is capable of low-temperature sintering and capable of suppressing occurrence of short circuit defects resulting from excessive sintering of the discharge auxiliary electrode by suppressing or preventing inflow of the glass component from the ceramic base material in a firing step, so that the present invention can be made more effective.

By providing a protective layer that covers the exposed surface of the discharge auxiliary electrode, in the ESD protection device according to the present invention, there can be obtained an ESD protection device which is excellent in heat resistance and water resistance and has a high short circuit resistance. By forming the protective layer so as to cover the exposed surfaces of the opposed electrodes as well, reliability can be further improved.

In the ESD protective device according to the present invention, the metal grains are preferably Cu grains, and this is because by using Cu grains as the metal grains, an ESD protection device capable of decreasing a discharge starting voltage and a peak voltage can be formed.

Silicon carbide grains are preferably used as the semiconductor grains, and this is because by using silicon carbide grains as the semiconductor grains, a clamping voltage can be decreased.

When the glass material is produced by a reaction of the metal grains with the semiconductor grains, in the ESD protection device according to the present invention, a discharge auxiliary electrode with a glass material uniformly dispersed therein can be efficiently and reliably formed without necessity to add a glass component separately to a raw material.

It is to be noted that the present invention does not exclude adding a glass material separately.

Furthermore, a method for manufacturing an ESD protection device according to the present invention includes the steps of: printing onto one principal surface of a first ceramic green sheet a discharge auxiliary electrode paste which contains metal grains having an average grain size of 1.0 μm or more, semiconductor grains and an organic vehicle and in which at least one of the metal grain and the semiconductor grain has on the surface a glass network forming component, and the ratio of the total of the metal grains and the semiconductor grains is 7% by volume to 25% by volume, thereby forming an unfired discharge auxiliary electrode; partially covering the discharge auxiliary electrode, and, printing the opposed electrode paste at a distance, thereby forming unfired opposed electrodes provided with an opposed electrode on one side and an opposed electrode on the other side, the opposed electrodes being placed at a distance therebetween; stacking a second ceramic green sheet on the other principal surface of the first ceramic green sheet, thereby forming an unfired laminated body; and firing the laminated body to react the surfaces of the metal grains of the discharge auxiliary electrode and the surfaces of the semiconductor grains, thereby producing a glass material, so that an ESD protection device having the structure of the present invention can be efficiently and reliably manufactured.

It is also possible to achieve an ESD protection device including external electrodes in such a way that an external electrode paste is printed on the surface of the unfired laminated body so as to be connected to the opposed electrodes, and then subjected to firing before the step of firing the laminated body, and it is also possible to form external electrodes in such a way that an external electrode paste is printed on the surface of the laminated body, and then subjected to firing after firing the laminated body.

In the method for manufacturing an ESD protection device according to the present invention, the glass network forming component which at least one of the metal grain and the semiconductor grain has on the surface itself forms glass, and examples thereof include $SiO_2$, $B_2O_3$, $Al_2O_3$, $P_2O_5$, $ZrO_2$, $V_2O_5$, $TiO_2$, $ZnO$, $GeO_2$, $As_2O_5$, $Sb_2O_5$, $PbO$ and $BeO$.

When alumina-coated Cu grains are used as metal grains contained in the discharge auxiliary electrode, and silicon carbide grains are used as a raw material for semiconductor grains, it is possible to efficiently manufacture an ESD protection device having stable characteristics, which are not degraded even if the static electricity is applied repeatedly, in which alumina ($Al_2O_3$) and a very small amount of silicon oxide that is normally present on the surface of silicon carbide serves as a glass network forming component, and the metal grains forming the discharge auxiliary electrode, the semiconductor grains, and the metal grain and the semiconductor grain are bound together, respectively, via a glass material.

BEST MODE FOR CARRYING OUT THE INVENTION

The following illustrate the examples of the present invention in order to describe the features of the present invention in more detail.

Example 1

[Structure of ESD Protection Device According to Example]

Figure 1:
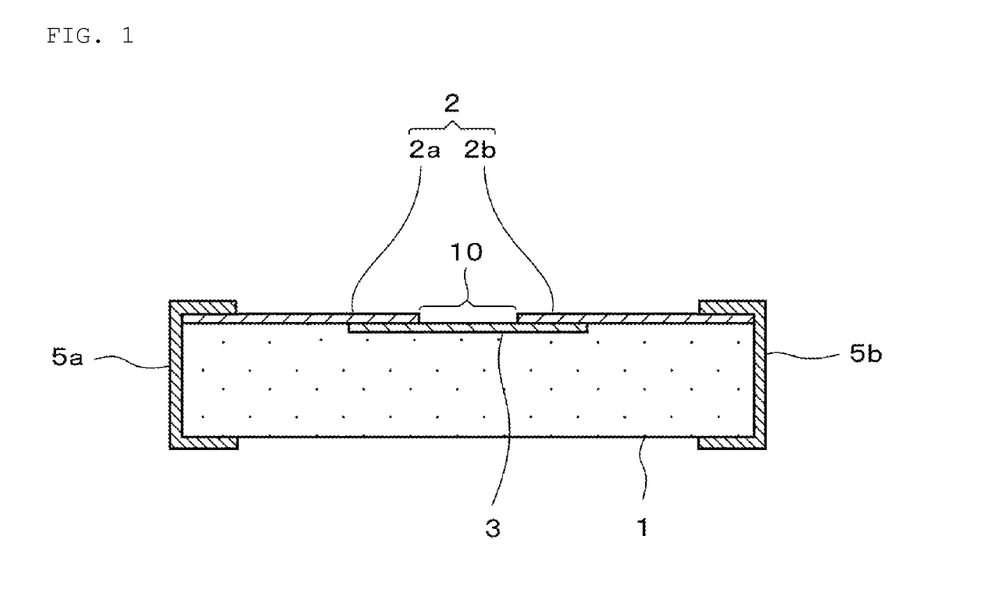
FIG. 1 is a front cross-sectional view schematically illustrating the structure of an ESD protection device according to an example of the present invention.
Figure 2:
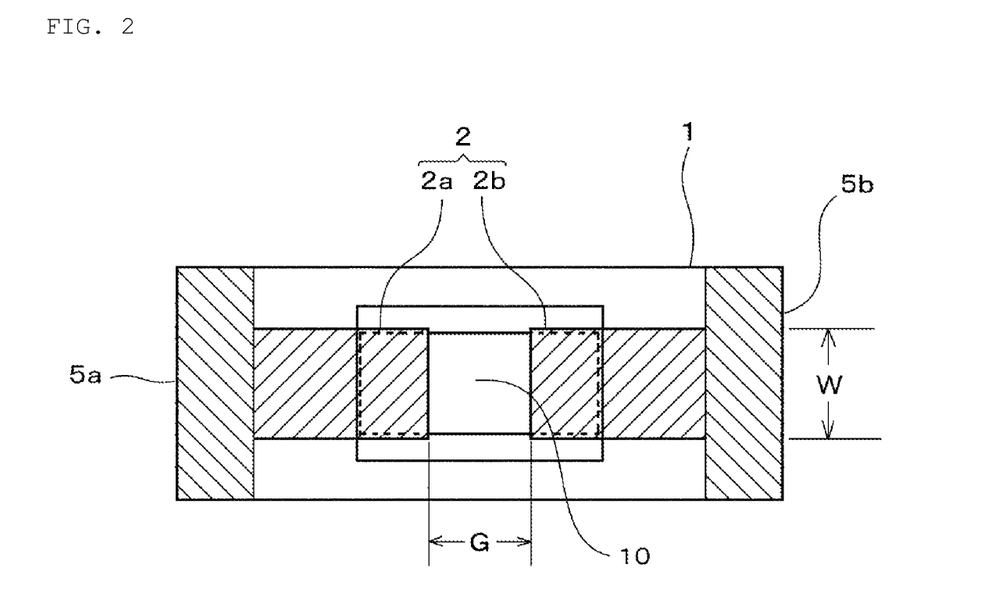
FIG. 2 is a plan view illustrating the structure of the ESD protection device according to the example of the present invention.

FIG. 1 is a cross-sectional view schematically illustrating the structure of an ESD protection device according to an example of the present invention, and FIG. 2 is a plan view of the ESD protection device according to the example of the present invention.

This ESD protection device includes, as shown in FIGS. 1 and 2, a ceramic base material 1, opposed electrodes 2 (extracting electrodes) of an opposed electrode 2a on one side and an opposed electrode 2b on the other side, which are formed on the same plane within the ceramic base material 1, and have ends opposed to each other, a discharge auxiliary electrode 3 in partial contact with the opposed electrode 2a on one side and the opposed electrode 2b on the other side, which is formed so as to extend from the opposed electrode 2a on one side to the opposed electrode 2b on the other side, and external electrodes 5a and 5b for external electrical connections, which are placed on both ends of the ceramic base material 1 to provide conduction to the opposed electrode 2a on one side and the opposed electrode 2b on the other side for constituting the opposed electrodes 2. The opposed electrode 2a on one side and the opposed electrode 2b on the other side are not necessarily required to have ends matching each other, and it suffices that a discharge gap is present between both the ends.

The discharge auxiliary electrode 3 contains metal grains, semiconductor grains and a glass material, and the metal grains, the semiconductor grains, and the metal grain and the semiconductor grain are bound together, respectively, via the glass material. The glass material is a reaction product produced by a reaction of the metal grains with the semiconductor grains.

Cu grains are used as the metal grains, and silicon carbide grains are used as the semiconductor grains.

In the ESD protection device according to the present invention, the relationship between the thickness Y of the discharge auxiliary electrode 3 and the average grain size X of the metal grains satisfies the requirement of $0.5 \leq Y/X \leq 3$ (i.e. requirement according to the present invention).

Further, in the ESD protection device of this embodiment, a glass ceramic substrate having a square-shaped plane, having a length of 1.0 mm, a width of 0.5 mm and a thickness of 0.3 mm and containing an oxide of Ba, Al or Si as a main constituent is used as the ceramic base material 1.

However, the constituent material of the ceramic base material 1 is not limited, and other types of base materials such as an alumina substrate and a silicon substrate can also be used in some cases. It is desirable to use, as the ceramic base material 1, one having a relative permittivity of 50 or less, preferably 10 or less.

A method will be described below for manufacturing an ESD protection device which has the structure as described above.

[Manufacture of ESD Protection Device]

(1) Preparation of Ceramic Green Sheet

Materials containing Ba, Al, and Si as main constituents are prepared as ceramic materials for the material of the ceramic base material 1.

Then, the respective materials are blended to provide a predetermined composition, and subjected to calcination at 800° C. to 1000° C. The calcined powder obtained is subjected to grinding in a zirconia ball mill for 12 hours to obtain a ceramic powder.

This ceramic powder with an organic solvent such as toluene or EKINEN added is mixed, followed by the further adding and mixing of a binder and a plasticizer, thereby preparing a slurry.

This slurry is subjected to shape forming by a doctor blade method, thereby preparing a ceramic green sheet with a thickness of 50 μm.

(2) Preparation of Opposed Electrode Paste

In addition, as an opposed electrode paste for forming the pair of opposed electrodes 2a and 2b, a binder resin including an 80 weight % of Cu powder with an average grain size of approximately 2 μm, ethyl cellulose, etc. is prepared, and agitated and mixed with the use of a three roll mill with the addition of a solvent to prepare an opposed electrode paste. It is to be noted that the average grain size of the Cu powder mentioned above refers to a median grain size (D50) obtained from grain size distribution measurement by Microtrack.

(3) Preparation of Discharge Auxiliary Electrode Paste

Further, as a discharge auxiliary electrode paste for forming the discharge auxiliary electrode 3, metal grains (metal conductor powder) and semiconductor grains (semiconductor powder) are blended in a predetermined ratio, a vehicle is added, and the mixture is agitated and mixed with the use of a three roll mill to thereby prepare a discharge auxiliary electrode paste.

The discharge auxiliary electrode paste is constituted such that the volume fraction of the vehicle is 75 to 95 vol %, and the volume fraction of the metal grains and semiconductor grains is 5 to 25 vol % as a valance.

Metal grain (metal conductor powder) species used for evaluation are shown in Table 1.

The amount of coating of $Al_2O_3$ (% by weight) and the amount of $ZrO_2$ (% by weight) in Table 1 are weight ratios of coating species to total coated Cu grains, and the residual part is constituted by metal grains (metal conductor powder).

Further, semiconductor grain (semiconductor powder) species used for evaluation are shown in Table 2. In addition, insulator grain (insulator powder) species used for comparative evaluation are shown at the same time.

Further, the composition of the vehicle, i.e. the types of binders, the solvent species, the dispersant species and blending ratios thereof, is shown in Table 3.

In addition, the compositions (vol %) of discharge auxiliary electrodes prepared using metal grains and semiconductor grains, insulator grains and vehicles are shown in Tables 4 and 5.

TABLE 1

| Sample Number | Metal grain species | Cu average grain size (μm) | Amount of coating of $Al_2O_3$ (wt %) | Amount of coating of $ZrO_2$ (wt %) |
|---|---|---|---|---|
| M1 | Cu | 0.15 | — | — |
| M2 | Cu | 0.35 | — | — |
| M3 | Cu | 0.55 | — | — |
| M4 | Cu | 1.10 | — | — |
| M5 | Cu | 3.10 | — | — |
| M6 | Cu | 6.10 | — | — |
| M7 | Cu | 3.10 | 1.0 | — |
| M8 | Cu | 3.10 | 3.0 | — |
| M9 | Cu | 3.10 | 5.0 | — |
| M10 | Cu | 3.10 | 7.0 | — |
| M11 | Cu | 3.10 | — | 1.0 |
| M12 | Cu | 3.10 | — | 3.0 |
| M13 | Cu | 3.10 | — | 5.0 |
| M14 | Cu | 3.10 | — | 7.0 |

TABLE 2

| Sample Number | Semiconductor grain species | Insulator grain species | Grain size distribution D50 (μm) |
|---|---|---|---|
| S1 | SiC | — | 0.1 |
| S2 | SiC | — | 0.3 |
| S3 | SiC | — | 0.5 |

TABLE 2-continued

| Sample Number | Semiconductor grain species | Insulator grain species | Grain size distribution D50 (μm) |
|---|---|---|---|
| S4 | — | $Al_2O_3$ | 0.1 |
| S5 | — | $Al_2O_3$ | 0.3 |
| S6 | — | $Al_2O_3$ | 0.5 |

TABLE 3

| Sample Number | Binder resin species (vol %) | | Solvent species (vol %) Dihydroterpineol | Dispersant species (vol %) Alkylamine salt of polyvalent fatty acid |
|---|---|---|---|---|
| | Ethocel Resin | Alkyd resin | | |
| B1 | 6.06 | 3.54 | 88.14 | 2.26 |

TABLE 4

| Paste No. | Metal conductor powder species (vol %) | | | | | | | | | | | | | | Semiconductor powder species (vol %) | | | | | | Vehicle (vol %) B-1 | Solid concentration (vol %) |
|---|---|---|---|---|---|---|---|---|---|---|---|---|---|---|---|---|---|---|---|---|---|---|
| | M-1 | M-2 | M-3 | M-4 | M-5 | M-6 | M-7 | M-8 | M-9 | M-10 | M-11 | M-12 | M-13 | M-14 | S1 | S2 | S3 | S4 | S5 | S6 | | |
| P-1 | 5.6 | — | — | — | — | — | — | — | — | — | — | — | — | — | 1.4 | — | — | — | — | — | 93 | 7 |
| P-2 | 8.0 | — | — | — | — | — | — | — | — | — | — | — | — | — | 2.0 | — | — | — | — | — | 90 | 10 |
| P-3 | 11.2 | — | — | — | — | — | — | — | — | — | — | — | — | — | 2.8 | — | — | — | — | — | 86 | 14 |
| P-4 | — | 5.6 | — | — | — | — | — | — | — | — | — | — | — | — | 1.4 | — | — | — | — | — | 93 | 7 |
| P-5 | — | 8.0 | — | — | — | — | — | — | — | — | — | — | — | — | 2.0 | — | — | — | — | — | 90 | 10 |
| P-6 | — | 11.2 | — | — | — | — | — | — | — | — | — | — | — | — | 2.8 | — | — | — | — | — | 86 | 14 |
| P-7 | — | — | 4.0 | — | — | — | — | — | — | — | — | — | — | — | 1.0 | — | — | — | — | — | 95 | 5 |
| P-8 | — | — | 5.6 | — | — | — | — | — | — | — | — | — | — | — | 1.4 | — | — | — | — | — | 93 | 7 |
| P-9 | — | — | 8.0 | — | — | — | — | — | — | — | — | — | — | — | 2.0 | — | — | — | — | — | 90 | 10 |
| P-10 | — | — | 11.2 | — | — | — | — | — | — | — | — | — | — | — | 2.8 | — | — | — | — | — | 86 | 14 |
| P-11 | — | — | — | 4.0 | — | — | — | — | — | — | — | — | — | — | 1.0 | — | — | — | — | — | 95 | 5 |
| P-12 | — | — | — | 5.6 | — | — | — | — | — | — | — | — | — | — | 1.4 | — | — | — | — | — | 93 | 7 |
| P-13 | — | — | — | 8.0 | — | — | — | — | — | — | — | — | — | — | 2.0 | — | — | — | — | — | 90 | 10 |
| P-14 | — | — | — | 11.2 | — | — | — | — | — | — | — | — | — | — | 2.8 | — | — | — | — | — | 86 | 14 |
| P-15 | — | — | — | 16.0 | — | — | — | — | — | — | — | — | — | — | 4.0 | — | — | — | — | — | 80 | 20 |
| P-16 | — | — | — | 4.0 | — | — | — | — | — | — | — | — | — | — | — | 1.0 | — | — | — | — | 95 | 5 |
| P-17 | — | — | — | 5.6 | — | — | — | — | — | — | — | — | — | — | — | 1.4 | — | — | — | — | 93 | 7 |
| P-18 | — | — | — | 8.0 | — | — | — | — | — | — | — | — | — | — | — | 2.0 | — | — | — | — | 90 | 10 |
| P-19 | — | — | — | 11.2 | — | — | — | — | — | — | — | — | — | — | — | 2.8 | — | — | — | — | 86 | 14 |
| P-20 | — | — | — | 16.0 | — | — | — | — | — | — | — | — | — | — | — | 4.0 | — | — | — | — | 80 | 20 |
| P-21 | — | — | — | 4.0 | — | — | — | — | — | — | — | — | — | — | — | — | 1.0 | — | — | — | 95 | 5 |
| P-22 | — | — | — | 8.0 | — | — | — | — | — | — | — | — | — | — | — | — | 2.0 | — | — | — | 90 | 10 |
| P-23 | — | — | — | 11.2 | — | — | — | — | — | — | — | — | — | — | — | — | 2.8 | — | — | — | 86 | 14 |
| P-24 | — | — | — | 16.0 | — | — | — | — | — | — | — | — | — | — | — | — | 4.0 | — | — | — | 80 | 20 |
| P-25 | — | — | — | — | 5.6 | — | — | — | — | — | — | — | — | — | 1.4 | — | — | — | — | — | 93 | 7 |
| P-26 | — | — | — | — | 8.0 | — | — | — | — | — | — | — | — | — | 2.0 | — | — | — | — | — | 90 | 10 |

TABLE 5

| Paste No. | Metal conductor powder species (vol %) | | | | | | | | | | | | | | Semiconductor powder species (vol %) | | | | | | Vehicle (vol %) B-1 | Solid concentration (vol %) |
|---|---|---|---|---|---|---|---|---|---|---|---|---|---|---|---|---|---|---|---|---|---|---|
| | M-1 | M-2 | M-3 | M-4 | M-5 | M-6 | M-7 | M-8 | M-9 | M-10 | M-11 | M-12 | M-13 | M-14 | S1 | S2 | S3 | S4 | S5 | S6 | | |
| P-27 | — | — | — | — | 11.2 | — | — | — | — | — | — | — | — | — | 2.8 | — | — | — | — | — | 86 | 14 |
| P-28 | — | — | — | — | 16.0 | — | — | — | — | — | — | — | — | — | 4.0 | — | — | — | — | — | 80 | 20 |
| P-29 | — | — | — | — | 4.0 | — | — | — | — | — | — | — | — | — | 1.0 | — | — | — | — | — | 95 | 5 |
| P-30 | — | — | — | — | 8.0 | — | — | — | — | — | — | — | — | — | — | — | 2.0 | — | — | — | 90 | 10 |
| P-31 | — | — | — | — | 11.2 | — | — | — | — | — | — | — | — | — | — | — | 2.8 | — | — | — | 86 | 14 |
| P-32 | — | — | — | — | 16.0 | — | — | — | — | — | — | — | — | — | — | — | 4.0 | — | — | — | 80 | 20 |
| P-33 | — | — | — | — | 29.6 | — | — | — | — | — | — | — | — | — | — | — | 7.4 | — | — | — | 63 | 37 |
| P-34 | — | — | — | — | — | 4.0 | — | — | — | — | — | — | — | — | 1.0 | — | — | — | — | — | 95 | 5 |
| P-35 | — | — | — | — | — | 11.2 | — | — | — | — | — | — | — | — | 2.8 | — | — | — | — | — | 86 | 14 |
| P-36 | — | — | — | — | — | 16.0 | — | — | — | — | — | — | — | — | 4.0 | — | — | — | — | — | 80 | 20 |
| P-37 | — | — | — | — | — | 20.0 | — | — | — | — | — | — | — | — | 5.0 | — | — | — | — | — | 75 | 25 |
| P-38 | — | — | — | — | — | 4.0 | — | — | — | — | — | — | — | — | 1.0 | — | — | — | — | — | 95 | 5 |
| P-39 | — | — | — | — | — | 11.2 | — | — | — | — | — | — | — | — | — | — | 2.8 | — | — | — | 86 | 14 |
| P-40 | — | — | — | — | — | 16.0 | — | — | — | — | — | — | — | — | — | — | 4.0 | — | — | — | 80 | 20 |
| P-41 | — | — | — | — | — | 20.0 | — | — | — | — | — | — | — | — | — | — | 5.0 | — | — | — | 75 | 25 |
| P-42 | — | — | — | — | — | — | 11.2 | — | — | — | — | — | — | — | — | — | 2.8 | — | — | — | 86 | 14 |
| P-43 | — | — | — | — | — | — | — | 11.2 | — | — | — | — | — | — | — | — | 2.8 | — | — | — | 86 | 14 |
| P-44 | — | — | — | — | — | — | — | — | 11.2 | — | — | — | — | — | — | — | 2.8 | — | — | — | 86 | 14 |
| P-45 | — | — | — | — | — | — | — | — | — | 11.2 | — | — | — | — | — | — | 2.8 | — | — | — | 86 | 14 |
| P-46 | — | — | — | — | — | — | — | — | — | — | 11.2 | — | — | — | — | — | 2.8 | — | — | — | 86 | 14 |
| P-47 | — | — | — | — | — | — | — | — | — | — | — | 11.2 | — | — | — | — | 2.8 | — | — | — | 86 | 14 |
| P-48 | — | — | — | — | — | — | — | — | — | — | — | — | 11.2 | — | — | — | 2.8 | — | — | — | 86 | 14 |

TABLE 5-continued

| Paste No. | Metal conductor powder species (vol %) | | | | | | | | | | | | | | Semiconductor powder species (vol %) | | | | | | Vehicle (vol %) | Solid concentration (vol %) |
|---|---|---|---|---|---|---|---|---|---|---|---|---|---|---|---|---|---|---|---|---|---|---|
| | M-1 | M-2 | M-3 | M-4 | M-5 | M-6 | M-7 | M-8 | M-9 | M-10 | M-11 | M-12 | M-13 | M-14 | S1 | S2 | S3 | S4 | S5 | S6 | B-1 | |
| P-49 | — | — | — | — | — | — | — | — | — | — | — | — | — | 11.2 | — | — | 2.8 | — | — | — | 86 | 14 |
| P-50 | — | — | — | — | — | — | — | 11.2 | — | — | — | — | — | — | — | — | — | 2.8 | — | — | 86 | 14 |
| P-51 | — | — | — | — | — | — | — | 11.2 | — | — | — | — | — | — | — | — | — | — | 2.8 | — | 86 | 14 |
| P-52 | — | — | — | — | — | — | — | 11.2 | — | — | — | — | — | — | — | — | — | — | — | 2.8 | 86 | 14 |

(4) Printing of Each Paste

First, a discharge auxiliary electrode paste prepared as described above is printed, by a screen printing method, on a first ceramic green sheet so as to form a predetermined pattern, and dried, thereby forming a discharge auxiliary electrode.

In the present invention, in the ESD protection device obtained, the average grain size X of metal grains that form the discharge auxiliary electrode is 1.0 μm or more, the relationship between the thickness Y of the discharge auxiliary electrode and the average grain size X of the metal grains satisfies the requirement of $0.5 \leq Y/X \leq 3$.

Further, the opposed electrode paste is applied to form an unfired opposed electrode on one side and an unfired opposed electrode on the other side, which form opposed electrodes. Thus, a discharge gap 10 is formed between the ends of the opposed electrode 2a on one side and the opposed electrode 2b on the other side, which are opposed to each other.

In this Example, the width W of the opposed electrode 2a on one side and the opposed electrode 2b on the other side which form the opposed electrodes 2 (FIG. 2) is 100 μm and the dimension G of the discharge gap 10 (FIG. 2) is 30 μm at the stage after firing. Even if the width W of the opposed electrodes 2 and the dimension G of the discharge gap 10 vary, the relationship between the thickness Y of the discharge auxiliary electrode and the average grain size X of the metal grains described above is required to satisfy the same requirement. This is because the relationship between X and Y indicates that a short circuit easily occurs between opposed electrodes as there arises a difference in sintering characteristics between the upper and lower parts of the film according to the number of grains with respect to the thickness.

(5) Stacking, Pressure Bonding

In the manner described above, a second ceramic green sheet coated with no paste is stacked on and pressure-bonded to the non-printing surface (lower surface) of the first ceramic green sheet coated with pastes, i.e. the discharge auxiliary electrode paste and the opposed electrode paste, in this order. Here, a laminated body, the thickness of which is 0.3 mm after firing, is formed.

(6) Cutting, Application of External Electrode Paste

The laminated body is cut with a micro-cutter to be divided into chips. Here, the laminated body is cut so that it has a length of 1.0 mm and a width of 0.5 mm after firing. Thereafter, an external electrode paste is applied to the end surface to form an unfired external electrode.

(7) Firing

Then, chips coated with the external electrode paste are fired in a $N_2$ atmosphere.

When an electrode material that is not oxidized is used, the chips can also be fired in the air atmosphere.

(8) Plating

The external electrode formed in the firing step of (7) described above is plated thereon with Ni and Sn in this order by electroplating. Thus, an external electrode, which includes a Ni-plated film and a Sn-plated film and is excellent in characteristics such as soldering characteristics, is formed.

Consequently, an ESD protection device having the structure shown in FIGS. 1 and 2 is obtained.

Figure 3:
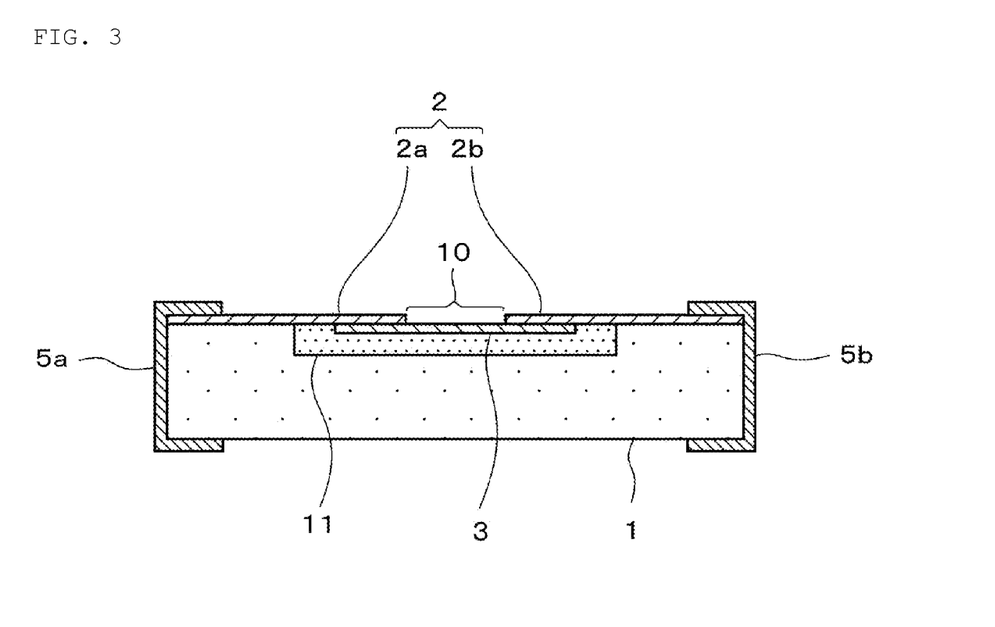
FIG. 3 is a front cross-sectional view illustrating another example of an ESD protection device according to an example of the present invention.

In Example 1, an ESD protection device having a structure in which a sealing layer 11 is placed so as to be interposed between the opposed portion of the opposed electrode 2a on one side and the opposed electrode 2b on the other side (discharge gap portion 10), the connection portion of the opposed electrodes 2 and the discharge auxiliary electrode 3, and the like and the ceramic base material 1 as shown in FIG. 3 as another example of the ESD protection device is prepared. This sealing layer 11 is a porous layer including ceramic grains such as alumina, which functions to absorb and keep (trap) the glass component contained in the ceramic base material 1 and the glass component produced in the ceramic base material 1 in a firing step to prevent a situation in which the glass component flows into the discharge auxiliary electrode 3, so that sintering proceeds excessively, and the conductivity of the discharge auxiliary electrode 3 becomes too high, thus causing short circuit defects.

Figure 4:
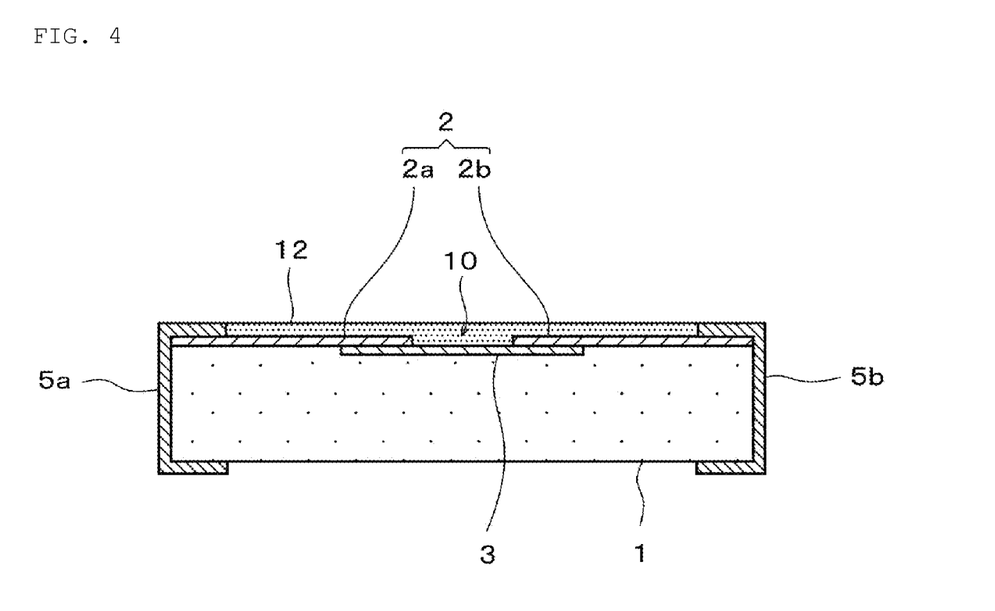
FIG. 4 is a front cross-sectional view illustrating still another example of an ESD protection device according to an example of the present invention.

In Example 1, as still another example of the ESD protection device, an ESD protection device is prepared in which the ESD protection device shown in FIG. 1 is provided with a protective layer 12 so as to cover the exposed surfaces of the opposed electrodes 2 and the discharge auxiliary electrode 3 as shown in FIG. 4. The protective layer 12 functions to improve the heat resistance and water resistance and enhances the short circuit resistance.

Figure 5:
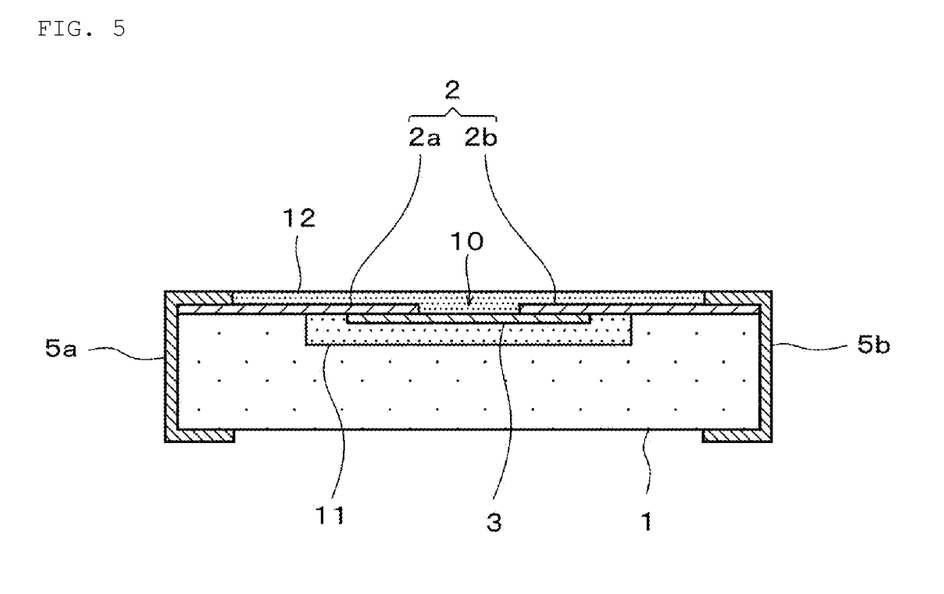
FIG. 5 is a front cross-sectional view illustrating still another example of an ESD protection device according to an example of the present invention.

In Example 1, as still another example, an ESD protection device including both the sealing layer 11 and protective layer 12 is prepared as shown in FIG. 5.

The sealing layer paste described below is used for formation of the sealing layer, and the resin material described below is used for formation of the protective layer.

(A) Sealing Layer Paste Used for Forming Sealing Layer

A sealing layer paste containing 50% by weight of an alumina powder having an average grain size of 0.5 μm, and an organic vehicle is provided as a paste for forming the sealing layer described above. It is to be noted that the average grain size of the alumina powder mentioned above refers to a median grain size (D50) obtained from grain size distribution measurement by Microtrack.

(B) Resin Material for Forming Protective Layer

A thermosetting silicone resin is provided as a resin material for forming the protective layer described above. The silicone resin is excellent in insulation property, chemical resistance, water resistance and heat resistance. For the protective layer, an epoxy resin can be used in place of the silicone resin, but the silicon resin is superior in heat resistance to the epoxy resin. If the protective layer is electrically broken down, the IR may be degraded, and therefore the silicone resin is more suitable for the protective layer than the epoxy resin.

For manufacturing an ESD protection device including the sealing layer 11 as shown in FIG. 3, a sealing layer paste is first applied to the first ceramic green sheet, a discharge auxiliary electrode paste is then printed on the applied sealing layer paste so as to have a predetermined pattern, and a step same as that in Example 1 is then carried out to thereby obtain an ESD protection device having the structure shown in FIG. 3.

For manufacturing an ESD protection device including the protective layer 12 as shown in FIG. 4, a silicone resin for formation of a protective layer is applied so as to cover the exposed surfaces of the opposed electrodes and the discharge auxiliary electrode exposed at the surface of the laminated body formed in the firing step of (7) in Example 1, and thermally cured to thereby form a protective layer, and a step same as that in Example described above is then carried out to thereby obtain an ESD protection device having the structure shown in FIG. 4.

For manufacturing an ESD protection device including the sealing layer 11 and the protective layer 12 as shown in FIG. 5, a sealing layer paste is first applied to the first ceramic green sheet, a discharge auxiliary electrode paste is then printed on the applied sealing layer paste so as to have a predetermined pattern, the laminated body is fired through a step same as that in Example 1 described above, a silicone resin for formation of a protective layer is applied so as to cover the exposed surfaces of the opposed electrodes and the discharge auxiliary electrode exposed at the surface of the fired laminated body obtained, and is thermally cured to thereby form the protective layer 12, and a step same as that in Example described above is then carried out to thereby obtain an ESD protection device having the structure shown in FIG. 5.

[Evaluation of Characteristics]

Next, the ESD protection devices prepared in the way described above were examined for their respective characteristics by the following methods.

(1) Short Circuit Resistance

The short circuit resistance was evaluated by examining an IR after applying a voltage of 8 kV 50 times, applying a voltage of 4 kv 10 times, applying a voltage of 2 kV 10 times, applying a voltage of 1 kV 10 times, applying a voltage of 0.5 kV 10 times and applying a voltage of 0.2 kV 10 times in contact discharge.

A sample having an IR of less than $10^6 \Omega$ was evaluated as having a poor short circuit resistance (x mark), and a sample having an IR of $10^6 \Omega$ or more is evaluated as having a good short circuit resistance (○ mark).

(2) ESD Discharge Responsiveness

For evaluating the ESD discharge responsiveness (ESD repetition resistance) that is a responsiveness to the repetition ESD, first the electrostatic discharge immunity test defined in the specification of IEC, IEC 61000-4-2 was conducted for each of 100 samples, and an average value thereof was determined. Then, for each sample, a voltage of 8 kV was applied 50 times, a voltage of 4 kV was applied 10 times, a voltage of 2 kV was applied 10 times, a voltage of 1 kV was applied 10 times, a voltage of 0.5 kV was applied 10 times, and a voltage of 0.2 kV was applied 10 times in contact discharge in the same manner as described in (1), followed by conducting an electrostatic discharge immunity test to examine an ESD discharge responsiveness (ESD repetition resistance).

In the electrostatic discharge immunity test after applying an static electricity repeatedly, a sample having a peak voltage of more than 900 V was evaluated as having a poor ESD discharge responsiveness (x mark), and a sample having a peak voltage of 900 V or less was evaluated as having a good ESD discharge responsiveness (○), the peak voltage being detected on the protection circuit side.

For 10 laminated bodies after firing, each laminated body was cut at the point of W=½ in the opposed electrodes in the stacking direction to expose the discharge auxiliary electrode, and the cross section thereof was polished. Next, the discharge auxiliary electrode exposed at the cross section was observed using a metal microscope, the circle-equivalent diameters of individual metal grains observed were measured using image processing software, and the average value thereof was defined as an average grain size X of metal grains forming the discharge auxiliary electrode. Similarly, the thicknesses of individual discharge auxiliary electrodes were measured by image processing software, and the average value thereof was defined as the thickness Y of the discharge auxiliary electrode. Then, from the values of the average grain size X and the thickness Y of the discharge auxiliary electrode, a relationship between the former and the latter (Y/X) was determined.

(3) PCT Test

As a PCT test (pressure cooker test), each of 100 samples was stored in a test bath at temperature of 120° C. and a humidity of 85% RH for 192 hours, followed by measuring an IR during application of a voltage of 50 kV as a direct-current voltage. A sample having an IR of less than $10^6 \Omega$ was evaluated as having a poor initial short circuit (x mark), a sample having an IR of $10^6 \Omega$ or more and less than $10^{11} \Omega$ was evaluated as having a good initial short circuit (○ mark), and a sample having an IR of $10^{11} \Omega$ or more was evaluated as having an excellent initial circuit (⊙ mark).

(4) Evaluation of Initial Short Circuit Resistance

After the ESD protection device was manufactured, an IR during application of a voltage of 50 kV as a direct-current voltage was measured for each of 100 samples. A sample having an IR of less than $10^6 \Omega$ was evaluated as having a poor initial short circuit resistance (x mark), a sample having an IR of $10^6 \Omega$ or more and less than $10^{11} \Omega$ was evaluated as having a good initial short circuit resistance (○ mark), and a sample having an IR of $10^{11} \Omega$ or more was evaluated as having an excellent initial circuit resistance (⊙ mark).

(5) Total Evaluation

A sample, for which the results of evaluation of both two characteristics, i.e. the above-described initial short circuit resistance and ESD discharge responsiveness, were good, was evaluated as having a good total evaluation result (○ mark), and a sample, for which any one or both of the characteristics described above were poor, was evaluated as having a poor total evaluation result (x mark). Further, a sample, for which the results of evaluation of both two characteristics, i.e. the above-described initial short circuit resistance and ESD discharge responsiveness, were good, and also the results of evaluation of two characteristics, i.e. the PCT test and initial short circuit, were excellent, was evaluated as having an excellent total evaluation result (⊙ mark).

Conditions for the discharge auxiliary electrode paste, the relationship between the average grain size X and the thickness Y of the discharge auxiliary electrode, characteristic evaluation results, and so on are shown in Tables 6 and 7.

In Tables 6 and 7, samples with symbol * added to the sample number are those that do not satisfy the requirement according to the present invention.

TABLE 6

| Sample number | Protective layer | Sealing layer | Paste No. | X (μm) | Y (μm) | Y/X | Short circuit resistance | ESD discharge responsiveness | PCT test | Initial short circuit | Total evaluation |
|---|---|---|---|---|---|---|---|---|---|---|---|
| *1 | No | No | P-1 | 0.10 | 0.30 | 3.00 | X | X | X | X | X |
| *2 | No | No | P-2 | 0.10 | 0.50 | 5.00 | X | X | X | X | X |
| *3 | No | No | P-3 | 0.10 | 1.00 | 10.00 | X | X | X | X | X |
| *4 | No | No | P-4 | 0.30 | 0.30 | 1.00 | X | X | X | X | X |
| *5 | No | No | P-5 | 0.30 | 0.50 | 1.67 | X | X | X | X | X |
| *6 | No | No | P-6 | 0.30 | 1.50 | 5.00 | X | X | X | X | X |
| *7 | No | No | P-7 | 0.50 | 0.20 | 0.40 | X | X | X | X | X |
| *8 | No | No | P-8 | 0.50 | 0.30 | 0.60 | X | X | X | X | X |
| *9 | No | No | P-9 | 0.50 | 0.50 | 1.00 | X | X | X | X | X |
| *10 | No | No | P-10 | 0.50 | 1.50 | 3.00 | X | X | X | X | X |
| *11 | No | No | P-11 | 1.00 | 0.40 | 0.40 | X | X | X | X | X |
| 12 | No | No | P-12 | 1.00 | 0.60 | 0.60 | ○ | ○ | ○ | ○ | ○ |
| 13 | No | No | P-13 | 1.00 | 1.00 | 1.00 | ○ | ○ | ○ | ○ | ○ |
| 14 | No | No | P-14 | 1.00 | 2.00 | 2.00 | ○ | ○ | ○ | ○ | ○ |
| 15 | No | No | P-15 | 1.00 | 3.00 | 3.00 | ○ | ○ | ○ | ○ | ○ |
| *16 | No | No | P-16 | 1.00 | 0.40 | 0.40 | X | X | X | X | X |
| 17 | No | No | P-17 | 1.00 | 0.60 | 0.60 | ○ | ○ | ○ | ○ | ○ |
| 18 | No | No | P-18 | 1.00 | 1.00 | 1.00 | ○ | ○ | ○ | ○ | ○ |
| 19 | No | No | P-19 | 1.00 | 2.00 | 2.00 | ○ | ○ | ○ | ○ | ○ |
| 20 | No | No | P-20 | 1.00 | 3.00 | 3.00 | ○ | ○ | ○ | ○ | ○ |
| *21 | No | No | P-21 | 1.00 | 0.40 | 0.40 | X | X | X | X | X |
| 22 | No | No | P-22 | 1.00 | 1.00 | 1.00 | ○ | ○ | ○ | ○ | ○ |
| 23 | No | No | P-23 | 1.00 | 2.00 | 2.00 | ○ | ○ | ○ | ○ | ○ |
| 24 | No | No | P-24 | 1.00 | 3.00 | 3.00 | ○ | ○ | ○ | ○ | ○ |
| *25 | No | No | P-25 | 3.00 | 0.70 | 0.23 | X | X | X | X | X |
| 26 | No | No | P-26 | 3.00 | 1.50 | 0.50 | ○ | ○ | ○ | ○ | ○ |
| 27 | No | No | P-27 | 3.00 | 3.00 | 1.00 | ○ | ○ | ○ | ○ | ○ |

TABLE 7

| Sample number | Protective layer | Sealing layer | Paste No. | X (μm) | Y (μM) | Y/X | Short circuit resistance | ESD discharge responsiveness | PCT test | Initial short circuit | Total evaluation |
|---|---|---|---|---|---|---|---|---|---|---|---|
| 28 | No | No | P-28 | 3.00 | 5.00 | 1.67 | ○ | ○ | ○ | ○ | ○ |
| *29 | No | No | P-29 | 3.00 | 0.70 | 0.23 | X | X | X | X | X |
| 30 | No | No | P-30 | 3.00 | 1.50 | 0.50 | ○ | ○ | ○ | ○ | ○ |
| 31 | No | No | P-31 | 3.00 | 3.00 | 1.00 | ○ | ○ | ○ | ○ | ○ |
| 32 | No | No | P-32 | 3.00 | 5.00 | 1.67 | ○ | ○ | ○ | ○ | ○ |
| *33 | No | No | P-33 | 3.00 | 12.00 | 4.00 | X | X | X | X | X |
| *34 | No | No | P-34 | 6.00 | 1.00 | 0.17 | X | X | X | X | X |
| 35 | No | No | P-35 | 6.00 | 3.50 | 0.58 | ○ | ○ | ○ | ○ | ○ |
| 36 | No | No | P-36 | 6.00 | 5.50 | 0.92 | ○ | ○ | ○ | ○ | ○ |
| 37 | No | No | P-37 | 6.00 | 7.00 | 1.17 | ○ | ○ | ○ | ○ | ○ |
| *38 | No | No | P-38 | 6.00 | 1.00 | 0.17 | X | X | X | X | X |
| 39 | No | No | P-39 | 6.00 | 3.50 | 0.58 | ○ | ○ | ○ | ○ | ○ |
| 40 | No | No | P-40 | 6.00 | 5.50 | 0.92 | ○ | ○ | ○ | ○ | ○ |
| 41 | No | No | P-41 | 6.00 | 7.00 | 1.17 | ○ | ○ | ○ | ○ | ○ |
| 42 | No | No | P-42 | 3.00 | 3.00 | 1.00 | ○ | ○ | ○ | ○ | ○ |
| 43 | No | No | P-43 | 3.00 | 3.00 | 1.00 | ○ | ○ | ○ | ○ | ○ |
| 44 | No | No | P-44 | 3.00 | 3.00 | 1.00 | ○ | ○ | ○ | ○ | ○ |
| 45 | No | No | P-45 | 3.00 | 3.00 | 1.00 | ○ | ○ | ○ | ○ | ○ |
| 46 | No | No | P-46 | 3.00 | 3.00 | 1.00 | ○ | ○ | ○ | ○ | ○ |
| 47 | No | No | P-47 | 3.00 | 3.00 | 1.00 | ○ | ○ | ○ | ○ | ○ |
| 48 | No | No | P-48 | 3.00 | 3.00 | 1.00 | ○ | ○ | ○ | ○ | ○ |
| 49 | No | No | P-49 | 3.00 | 3.00 | 1.00 | ○ | ○ | ○ | ○ | ○ |
| *50 | No | No | P-50 | 3.00 | 3.00 | 1.00 | X | ○ | X | X | X |
| *51 | No | No | P-51 | 3.00 | 3.00 | 1.00 | X | ○ | X | X | X |
| *52 | No | No | P-52 | 3.00 | 3.00 | 1.00 | X | ○ | X | X | X |
| 53 | No | Yes | P-27 | 3.00 | 3.00 | 1.00 | ○ | ○ | ○ | ⊙ | ○ |
| 54 | Yes | No | P-27 | 3.00 | 3.00 | 1.00 | ○ | ○ | ⊙ | ○ | ○ |
| 55 | Yes | Yes | P-27 | 3.00 | 3.00 | 1.00 | ○ | ○ | ⊙ | ⊙ | ⊙ |

It has been found from Tables 6 and 7 that for the ESD protection devices of sample numbers 1 to 10 in which the average grain size X of metal grains contained in the discharge auxiliary electrode is less than 1.0, and thus the requirement according to the present invention is not satisfied, the short circuit resistance and the ESD discharge responsiveness are degraded as a result of repeated ESD application.

It has been found that for the ESD protection devices of sample numbers 11, 16, 21, 25, 29, 33, 34 and 38 in which the relationship between the thickness Y of the discharge auxiliary electrode and the average grain size X of metal grains is 0.5>Y/X, and thus the requirement according to the present invention is not satisfied, the short circuit resistance is degraded.

On the other hand, for the ESD protection devices of sample numbers 12 to 15, 17 to 20, 22 to 24, 26 to 28, 30 to 32, 35 to 37 and 39 to 49 in which the average grain size X of metal grains contained in the discharge auxiliary electrode is 1.0 μm or more, and the relationship between the thickness Y of the discharge auxiliary electrode and the average grain size X of metal grains is $0.5 \leq Y/X \leq 3$, and thus the requirement according to the present invention is satisfied, the short circuit resistance is good, and the ESD discharge responsiveness is good.

It has been found that for the ESD protection devices of sample numbers 50 to 52 which use insulator grains $Al_2O_3$ in place of semiconductor grains, the short circuit resistance is degraded.

This is considered to be because the density of Cu in the discharge auxiliary electrode is locally increased. That is, this is thought to be because an excessive liquid phase component is formed by a very small amount of $Al_2O_3$ that are locally present in the discharge auxiliary electrode, and Cu grains are locally brought into an excessively sintered state.

It has been found that for the ESD protection device of sample number 53 which includes a sealing layer (ESD protection device having the structure shown in FIG. 3), such an effect is obtained that the short circuit resistance and the ESD discharge responsiveness are good as in the case of the above-described samples, and further a liquid phase component of the ceramic base material, which is generated in the firing process, is inhibited from diffusing to the discharge auxiliary electrode, so that IR characteristics in initial short circuit evaluation are improved.

It has been found that for the ESD protection device of sample number 54 which includes a protective layer (ESD protection device having the structure shown in FIG. 4), such an effect is obtained that the short circuit resistance and the ESD discharge responsiveness are good as in the case of the above-described samples, and further the discharge auxiliary electrode is covered with the protective layer, so that IR characteristics in PCT test evaluation are improved.

Further, it has been found that the ESD protection device of sample number 55 which include both the sealing layer and protective layer (ESD protection device having the structure shown in FIG. 5) is excellent particularly in PCT characteristics and initial short circuit resistance, and also excellent in total evaluation.

From the results of Example described above, it has been found that when the average grain size X of metal grains forming the discharge auxiliary electrode is 1.0 μm or more, and the relationship between the thickness Y of the discharge auxiliary electrode and the average grain size X of metal grains satisfies the requirement of $0.5 \leq Y/X \leq 3$,
(a) the short circuit resistance associated with repeated ESD application is good; and
(b) even if glass is not added, the surfaces of metal grains forming the discharge auxiliary electrode and the surfaces of semiconductor grains react with each other to produce a glass material in a firing step, and the metal grains, the semiconductor grains, and the metal grain and the semiconductor grain are bound together, respectively, by the glass material, so that the short circuit resistance is kept good even when the static electricity is applied repeatedly.

It has also been found that by providing a sealing layer and/or a protective layer, an ESD protection device having further improved characteristics and high reliability is obtained.

It is to be noted that the present invention is not limited to Example described above, and various applications can be found and various modifications can be made within the scope of the present invention concerning the constituent materials of the opposed electrodes, the specific shapes thereof, the specific shape of the discharge auxiliary electrode, the types of metal grains forming the discharge auxiliary electrode, and semiconductor grains, the type of the glass material that functions to bind together the metal grains, the semiconductor grains, and the metal grain and the semiconductor grain, respectively, and so on.

DESCRIPTION OF REFERENCE SYMBOLS

1 ceramic material
2 opposed electrodes
2a opposed electrode on one side which forms opposed electrodes
2b opposed electrode on the other side which forms opposed electrodes
3 discharge auxiliary electrode paste
5a, 5b external electrodes
10 discharge gap portion
11 sealing layer
12 protective layer
W width of opposed electrodes
G dimension of discharge gap portion

The invention claimed is:

1. An ESD protection device which comprises:
a ceramic base material;
opposed electrodes provided with one-sided opposed electrode and an other-sided opposed electrode on a surface of the ceramic base material, the opposed electrodes being formed so as to be opposed to each other at a distance therebetween; and
a discharge auxiliary electrode contacting each of the one-sided opposed electrode and the other-sided opposed electrode constituting the opposed electrodes, the discharge auxiliary electrode being placed so as to extend from the one-sided opposed electrode to the other-sided opposed electrode,
wherein the discharge auxiliary electrode contains metal grains, semiconductor grains and a glass material, and each of the metal grains, each of the semiconductor grains, and each of the metal grains and each of the semiconductor grains are bound together, respectively, via the glass material, and
an average grain size X of the metal grains is 1.0 μm or more, and a relationship between a thickness Y of the discharge auxiliary electrode and the average grain size X of the metal grains satisfies a requirement of $0.5 \leq Y/X \leq 3$.

2. The ESD protection device according to claim 1, wherein the ceramic base material contains a glass component, and the ESD protection device further comprises a sealing layer for preventing ingress of the glass component from the ceramic base material into the discharge auxiliary electrode between the discharge auxiliary electrode and the ceramic base material.

3. The ESD protection device according to claim 1, wherein the ESD protection device further comprises a protective layer that covers an exposed surface of the discharge auxiliary electrode.

4. The ESD protection device according to claim 1, wherein the metal grains are Cu grains.

5. The ESD protection device according to claim 1, wherein the semiconductor grains are silicon carbide grains.

6. The ESD protection device according to claim 1, wherein the glass material is produced by a reaction of the metal grains with the semiconductor grains.

7. A method for manufacturing an ESD protection device, wherein the method comprises the steps of:

printing a discharge auxiliary electrode paste onto one principal surface of a first ceramic green sheet to form an unfired discharge auxiliary electrode, wherein the discharge auxiliary electrode paste contains metal grains having an average grain size of 1.0 μm or more, semiconductor grains and an organic vehicle, and surfaces of at least one of the metal grains and the semiconductor grains have a glass network forming component, and a combined ratio of the metal grains and the semiconductor grains is 7% by volume to 25% by volume;

printing an opposed electrode paste on one principal surface of the first ceramic green sheet to form unfired opposed electrodes provided with one-sided opposed electrode and an other-sided opposed electrode, wherein the one-sided opposed electrode and the other-sided opposed electrode each partially cover the unfired discharge auxiliary electrode and are placed at a distance therebetween;

stacking a second ceramic green sheet on an other principal surface of the first ceramic green sheet to form an unfired laminated body; and firing the unfired laminated body to react the surfaces of the metal grains and the surfaces of the semiconductor grains of the discharge auxiliary electrode to produce a glass material.

8. The method for manufacturing an ESD protection device according to claim 7, wherein the metal grains contained in the discharge auxiliary electrode are alumina-coated Cu grains, and the semiconductor grains are silicon carbide grains.

* * * * *

UNITED STATES PATENT AND TRADEMARK OFFICE
CERTIFICATE OF CORRECTION

PATENT NO. : 9,077,174 B2
APPLICATION NO. : 13/852227
DATED : July 7, 2015
INVENTOR(S) : Hiehata et al.

It is certified that error appears in the above-identified patent and that said Letters Patent is hereby corrected as shown below:

On the title page item [63], insert --Related U.S. Application Data, Continuation of application No. PCT/JP2011/072015, filed Sept. 27, 2011.--

Signed and Sealed this
First Day of December, 2015

Michelle K. Lee
*Director of the United States Patent and Trademark Office*